(12) United States Patent
Noda et al.

(10) Patent No.: US 8,307,992 B2
(45) Date of Patent: Nov. 13, 2012

(54) LIQUID SEPARATION MEMBRANE INSTALLATION BODY

(75) Inventors: Kenichi Noda, Nagoya (JP); Makiko Niino, Nagoya (JP); Miyuki Yabuki, Inuyama (JP)

(73) Assignee: NGK Insulators, Ltd., Nagoya (JP)

( * ) Notice: Subject to any disclaimer, the term of this patent is extended or adjusted under 35 U.S.C. 154(b) by 669 days.

(21) Appl. No.: 12/043,278

(22) Filed: Mar. 6, 2008

(65) Prior Publication Data

US 2008/0156721 A1  Jul. 3, 2008

Related U.S. Application Data

(63) Continuation of application No. PCT/JP2007/067803, filed on Sep. 13, 2007.

(30) Foreign Application Priority Data

Sep. 28, 2006  (JP) .................................. 2006-265970

(51) Int. Cl.
*B01D 29/05* (2006.01)
*B01D 29/00* (2006.01)
*B01D 29/46* (2006.01)

(52) U.S. Cl. .................... 210/488; 210/500.25; 210/483

(58) Field of Classification Search ............... 210/500.2, 210/640, 641, 650, 652, 653, 654, 321.6, 210/321.61, 321.64, 321.84
See application file for complete search history.

(56) References Cited

U.S. PATENT DOCUMENTS

| 4,719,058 | A | 1/1988 | Komoda |
| 5,190,654 | A | 3/1993 | Bauer |
| 5,955,049 | A | 9/1999 | Ogata et al. |
| 5,980,849 | A | 11/1999 | Ogata et al. |
| 2004/0038556 | A1* | 2/2004 | French et al. .................. 438/800 |
| 2006/0257662 | A1* | 11/2006 | Bujard et al. .................. 428/404 |

FOREIGN PATENT DOCUMENTS

| EP | 0 887 101 A1 | 12/1998 |
| JP | 03-068730 B2 | 10/1991 |
| JP | 06-340413 A1 | 12/1994 |
| JP | 07-144907 A1 | 6/1995 |

(Continued)

OTHER PUBLICATIONS

Van Gestel et al. "Alumina and titania multilayer membranes for nanofiltration: preparation, characterization and chemical stability." Journal of Membrane Science, vol. 207, 2002, pp. 73-89.*

(Continued)

*Primary Examiner* — Vickie Kim
*Assistant Examiner* — Katherine Zalasky
(74) *Attorney, Agent, or Firm* — Burr & Brown (57) ABSTRACT

A liquid separation membrane installation body includes a porous base material, and a liquid separation membrane provided on the porous base material, the liquid separation membrane is a porous membrane formed of a dispersant layered inorganic compound, and a membrane thickness of the liquid separation membrane is 0.1 to 1.5 μm. The liquid separation membrane is preferably formed of a sheet-like dispersant layered inorganic compound which has a thickness of 0.1 to 100 nm, a major diameter of 0.01 to 5 μm and an aspect ratio (the major diameter/the thickness) of 3 or more and which is formed into the membrane on the porous base material. There is disclosed the liquid separation membrane installation body capable of increasing a permeation flow rate of a liquid.

6 Claims, 3 Drawing Sheets

FOREIGN PATENT DOCUMENTS

| | | | |
|---|---|---|---|
| JP | 2580528 | B2 | 11/1996 |
| JP | 09-239228 | A1 | 9/1997 |
| JP | 3341278 | B2 | 8/2002 |
| JP | 3379353 | B2 | 12/2002 |

OTHER PUBLICATIONS

Chapter 3 Materials and preparation of inorganic membranes, In: H.P. Hsieh, Editor(s), Membrane Science and Technology, Elsevier, 1996, vol. 3, Inorganic Membranes for Separation and Reaction, pp. 23-92.*

Liangxiong Li et al., "Preparation of α-Alumina-Supported Mesoporous Bentonite Membranes for Reverse Osmosis Desalination of Aqueous Solutions," Journal of Colloid and Interface Science, 2004, vol. 273, No. 2, pp. 540-546.

S. Vercauteren, et al., ""The Preparation and Characterization of Ceramic Membranes with a Pillared Clay Top Layer"," Colloids and Surfaces, a: Physicochemical and Engineering Aspects, vol. 138, No. 2-3, Jul. 15, 1998, pp. 367-376.

European Office Action dated Feb. 29, 2012.

\* cited by examiner

LIQUID SEPARATION MEMBRANE INSTALLATION BODY

TECHNICAL FIELD

The present invention relates to a liquid separation membrane installation body. More particularly, it relates to a liquid separation membrane installation body capable of increasing a permeation flow rate of a liquid.

BACKGROUND ART

Heretofore, a method for performing separation by use of a clay has been suggested. For example, it is disclosed that the clay is formed into a sheet-like self-standing membrane and can be used as a separation membrane (a clay membrane) (for example, see Patent Document 1). Moreover, a separation method, which uses a clay membrane formed on a base material but which has a purpose of separation of a gas, is disclosed (for example, see Patent Document 2). An example is disclosed in which a 2 μm clay membrane is formed on the base material to separate salt in salt water (for example, see Non-Patent Document 1).

Furthermore, it is reported that the clay membrane is treated to synthesize a mesoporous material (for example, see Patent Documents 3, 4), however a target of this treated clay membrane is a catalyst carrier or the like, and the membrane has large pore diameters, and cannot therefore separate a liquid through pores.

Patent Document 1: JP-A-H06-340413;
Patent Document 2: JP-A-H09-239228;
Patent Document 3: JP-B-3341278;
Patent Document 4: JP-B-3379353; and
Non-Patent Document 1: J. Colloid and Interface Sci. 273 (2004), pp. 540 to 546.

DISCLOSURE OF THE INVENTION

A clay membrane disclosed in Patent Document 1 described above is a self-standing membrane, and therefore has a large membrane thickness, and thus it cannot be said that, for example, permeability of a liquid is satisfactory. A clay membrane disclosed in Patent Document 2 described above is formed for separation of a gas, and is supposed to have a problem that a clay is dispersed again in the liquid and cannot be used for separation of a liquid. A clay membrane disclosed in Non-Patent Document 1 described above has a large membrane thickness, and therefore has a problem that a permeation flow rate of the liquid cannot sufficiently be increased and a problem that a separation performance is difficult to be improved.

The present invention has been developed in view of the above-mentioned problem, and is characterized by providing a liquid separation membrane installation body capable of increasing a permeation flow rate of a liquid.

To achieve the above object, according to the present invention, the following liquid separation membrane installation body is provided.

[1] A liquid separation membrane installation body which comprising: a porous base material; and a liquid separation membrane provided on the porous base material, the liquid separation membrane being a porous membrane formed of a dispersant layered inorganic compound, a membrane thickness of the liquid separation membrane being in a range of 0.1 to 1.5 μm.

[2] The liquid separation membrane installation body according to [1], wherein the liquid separation membrane is formed of a sheet-like dispersant layered inorganic compound having a thickness of 0.1 to 100 nm, a major diameter of 0.01 to 5 μm and an aspect ratio (the major diameter/the thickness) of 3 or more on the porous base material.

[3] The liquid separation membrane installation body according to [1] or [2], wherein the dispersant layered inorganic compound is at least one selected from the group consisting of a clay compound, a silica nano sheet, a titania nano sheet, a niobium oxide nano sheet and a graphite nano sheet.

[4] The liquid separation membrane installation body according to [3], wherein the clay compound is at least one selected from the group consisting of smectite, vermiculite and mica.

[5] The liquid separation membrane installation body according to any one of [1] to [4], wherein an average pore diameter of the liquid separation membrane is in a range of 0.1 to 10 nm.

[6] The liquid separation membrane installation body according to any one of [1] to [5], wherein the liquid separation membrane is formed of the dispersant layered inorganic compound sintered and provided on the surface of the porous base material.

[7] The liquid separation membrane installation body according to any one of [1] to [6], wherein a vacuum reaching pressure is 1000 Pa or less at a time when one of the surfaces of the liquid separation membrane is set to an atmospheric pressure and a pressure of the other surface thereof is reduced at an exhaust rate of 1.5 L/cm$^2$·minute.

[8] The liquid separation membrane installation body according to any one of [1] to [7], wherein the liquid separation membrane is provided on the surface of the porous base material by filtration membrane formation.

According to the liquid separation membrane installation body of the present invention, the permeation flow rate at a time when the liquid is separated can be increased. In particular, the present invention can suitably be used as a separation membrane which separates water or the like from a mixed liquid such as salt water, a water-alcohol mixed liquid, a water-acid mixed liquid or a water-alkali mixed liquid.

DESCRIPTION OF REFERENCE NUMERALS

1: a container for separation, 2: a liquid separation membrane installation body, 3: a container main body, 4: a bottomed cylindrical container, 5: a lid portion, 6: an inner cylinder (a glass tube), 7: a cooling tube, 8: a temperature gauge, 9: a stirring member, 10: a union, 11: a rubber plug, 12: a container for a heat medium, 13: a sealing member, 14: a trap unit, 15: a pressure reduction device, 16: a pipe for pressure reduction, 17: a cold tube, 21: a mixed liquid side space; 22: a pressure reduction side space, 31: a mixed liquid, 32: a membrane permeable substance, 33: a heat medium, 34: liquid nitrogen, 41: a storage container, 42: a stirring member, 43: a stirrer, 44: a liquid supply pump, 51: a pressure-resistant container, 52: a liquid separation membrane installation body, 53: a sealing member, 54: a sample holder, 55: a sample attachment portion, 61: a liquid supply pipe, 62: a collection pipe, 63: a pressure gauge, 64: a back pressure valve, 70: a membrane permeable liquid, 71: a mixed liquid, 81, 91: liquid separation membrane installation bodies, 82: a sealing member, 83, 93: sample holders, 84, 94: pressure gauges and 100, 200: separation devices.

BEST MODE FOR CARRYING OUT THE INVENTION

The best mode for carrying out the present invention will hereinafter specifically be described, however it should be understood that the present invention is not limited to the following embodiment, and design can appropriately be altered or modified based on ordinary knowledge of any person skilled in the art without departing from the scope of the present invention.

One embodiment of a liquid separation membrane installation body according to the present invention is a liquid separation membrane installation body having a porous base material and a liquid separation membrane provided on the porous base material, the liquid separation membrane is a porous membrane formed of a dispersant layered inorganic compound, and the liquid separation membrane has a membrane thickness of 0.1 to 1.5 μm.

Thus, the liquid separation membrane is formed of the dispersant layered inorganic compound formed into the membrane having a thickness of 0.1 to 1.5 μm on the surface of the porous base material, whereby a permeation flow rate of a liquid can be increased during separation of the liquid. When the thickness of the liquid separation membrane is smaller than 0.1 μm, a separation performance unfavorably deteriorates. When the thickness is larger than 1.5 μm, the permeation flow rate unfavorably slows. The thickness of the liquid separation membrane is a value measured by observing a cross section of the membrane with an electron microscope.

(I) Liquid Separation Membrane:

The liquid separation membrane constituting the liquid separation membrane installation body of the present invention is a porous membrane of an inorganic compound in which the dispersant layered inorganic compound is formed into the membrane and sintered. It is preferable that the dispersant layered inorganic compound is a sheet-like compound having a thickness of 0.1 to 100 nm, a major diameter of 0.01 to 5 μm, and an aspect ratio (the major diameter/the thickness) of 3 or more. Since the dispersant layered inorganic compound has such a shape, when the compound is provided on the surface of the porous base material, the compound does not enter pores of the porous base material, and the dispersant layered inorganic compounds can be superimposed on each other to form appropriate pores. The lower limit for the thickness, which is 0.1 nm, is a thickness of a single layer of the layered inorganic compound, and cannot be reduced any more. In a case where the thickness is larger than 100 nm, when the layered inorganic compound is formed into the membrane on the base material, the pores formed by the superimposition of the layered inorganic compounds might excessively enlarge. When the major diameter is smaller than 0.01 μm, the layered inorganic compound easily enters the base material. When the diameter is larger than 5 μm, the layered inorganic compound is not easily dispersed in a solvent. It is to be noted that to avoid the entrance of the layered inorganic compound into the base material, the major diameter of the layered inorganic compound needs to have a value larger than that of a pore diameter of the base material to be used. When the aspect ratio is smaller than 3, the layered inorganic compound formed into the membrane on the porous base material is not easily two-dimensionally oriented, so that the pore diameters easily become larger than a desired value. Here, the major diameter is a length of a most elongated portion of the surface of the sheet-like compound. For example, the major diameter of a rectangular shape is a length of a diagonal line, and the major diameter of an elliptic shape is a long diameter of an ellipse. The thickness and major diameter of the dispersant layered inorganic compound are values measured with a transmission electron microscope.

An average pore diameter of the liquid separation membrane is preferably 0.1 to 10 nm, further preferably 0.2 to 2 nm. When the diameter is smaller than 0.1 nm, the permeation rate during separation of the liquid sometimes slows. When the diameter is larger than 10 nm, the membrane is sometimes not suitable for separation of the liquid. The pore diameters can be measured by a nanopermporometer.

The dispersant layered inorganic compound has, as a unit structure, a structure where one layer or two or more layers are laminated, each layer having a structure in which a plurality of tetrahedrons and/or octahedrons of metal oxide are bonded in the form of a plane and spread in the form of a sheet, and one unit or two or more units of this unit structure are laminated. And, the above-mentioned preferable thickness, major diameter and aspect ratio of the dispersant layered inorganic compound indicate a shape at a time when the dispersant layered inorganic compound having such a laminated structure is dispersed in a solvent such as water or an organic solvent. Moreover, it is preferable that the metal oxide constituting the dispersant layered inorganic compound include at least one metal selected from the group consisting of Si, Al, Mg, Fe, Ti, and Nb. In the dispersant layered inorganic compound, alkali ions, alkali earth ions, ammonium ions or the like may coexist between the layers. It is preferable that the ions present between the layers are sodium ions, potassium ions, or ammonium ions from a viewpoint of dispersibility.

It is preferable that the dispersant layered inorganic compound is at least one selected from a clay compound, a silica nano sheet, a titania nano sheet, a niobium oxide nano sheet and a graphite nano sheet. It is preferable that the clay compound is at least one selected from smectite, vermiculite and mica.

The liquid separation membrane constituting the liquid separation membrane installation body of the present embodiment is formed by sintering a part of the dispersant layered inorganic compound. Therefore, as compared with a case where the membrane is formed simply by drying the compound, the dispersant layered inorganic compounds are firmly bonded to each other, and re-dispersion of the dispersant layered inorganic compound when used in the liquid can be prevented.

The liquid separation membrane (a membrane made of the dispersant layered inorganic compound) may additionally include a small amount of sol, slurry or the like. Examples of components of the sol or the slurry include silica, alumina, zirconia, titania and a mixture thereof.

Moreover, the dispersant layered inorganic compound may be subjected to modification using an organic compound or ion exchange. As the organic compound for performing the modification, organic ammonium ions or the like may be used. In the ion exchange, alkali ions such as sodium or potassium, alkali earth ions such as calcium, ammonium ions or the like may be used. The modification or the ion exchange may be performed before or after the dispersant layered inorganic compound is formed into the membrane. The pore diameters, hydrophilicity or hydrophobicity of the dispersant layered inorganic compound can be changed by the modification or the ion exchange.

(II) Porous Base Material:

In the liquid separation membrane installation body of the present invention, the liquid separation membrane is provided on the surface of the porous base material, however the liquid separation membrane is provided on the surface of a support body, whereby even if the liquid separation membrane is formed to be a thin membrane, the membrane can be supported by the porous base material, the shape of the membrane can be maintained, and breakage or the like thereof can be prevented. Moreover, in the liquid separation membrane, as described above, the sheet-like dispersant layered inorganic compounds are superimposed on one another and formed on the surface of the porous base material, so that the compounds do not enter the pores of the porous base material. Therefore, unlike a case where a zeolite membrane or the like is provided on the surface of the porous base material and a part of zeolite or the like enters the pores of the porous base material, permeation resistance of the present invention does not increase, and the permeation flow rate does not lower. Accordingly, from such a structure, it is also seen that the liquid separation membrane installation body of the present embodiment in which the dispersant layered inorganic compound is formed into the liquid separation membrane on the surface of the porous base material is suitable for increasing the permeation flow rate.

There is not any special restriction on the porous base material as long as the porous base material is formed of a porous material, the liquid separation membrane can be formed on the surface of the porous base material, and the porous base material can be used in the liquid. A material, a shape and a size of the porous base material can appropriately be determined in accordance with an application or the like thereof. Examples of the material constituting the porous base material include ceramics such as alumina ($\alpha$-alumina, $\gamma$-alumina, anodized alumina and the like), and zirconia, and a metal such as stainless steel. Alumina is preferable from viewpoints of ease of preparation of the porous base material and availability. As alumina, it is preferable that alumina particles as a raw material having an average particle diameter of 0.001 to 30 µm are formed and sintered. The shape of the porous base material may be any shape such as a plate shape, a cylindrical shape, a tubular shape having a polygonal cross section, a monolith shape or a spiral shape. The porous base material has a large number of three-dimensionally continuous micro pores. The pore diameters of the pores are preferably 0.003 to 2 µm, further preferably 0.05 to 1 µm.

(III) Liquid Separation:

The liquid separation membrane installation body of the present embodiment is suitably used in concentrating a specific liquid or solute from the mixed liquid. For example, salt water is passed through the liquid separation membrane installation body, whereby water selectively permeates the liquid separation membrane, and a liquid in which water is concentrated can be obtained. On the other hand, the liquid which has not permeated the liquid separation membrane is a salt-concentrated liquid. Moreover, a mixed solution of water and alcohol can be separated into a water-concentrated liquid and an alcohol-concentrated liquid. In particular, the present embodiment can suitably be used in concentration and separation of a mixed liquid of water and ethanol.

(IV) Manufacturing Method:

In a manufacturing method of the liquid separation membrane installation body according to the present embodiment, first, the dispersant layered inorganic compound is dispersed in a solvent such as water, and formed into a membrane on the surface of the porous base material. As a method for forming the dispersant layered inorganic compound into the membrane on the surface of the porous base material, filtration membrane formation, dip coating or the like may be used, and the filtration membrane formation is more preferable.

In Non-Patent Document 1 described above, even though a membrane thickness is about 2 µm, an ion removal ratio in a reverse osmosis test remains at about 45%. On the other hand, in the separation membrane of the present invention, for example, a liquid separation membrane installation body of Example 2 described later, the ion removal ratio is as high as 70%. This is supposedly because the formed membrane of the Non-Patent Document 1 is not densified sufficiently to a degree required for the liquid separation. On the other hand, in the present embodiment, a sufficiently dense membrane is formed, and hence such a problem is not generated. Such a degree of densification of a membrane can be evaluated in accordance with the vacuum reaching pressure. Thus, the separation membrane of Non-Patent Document 1 is different from that of the present invention in a micro structure.

Figure 3A:
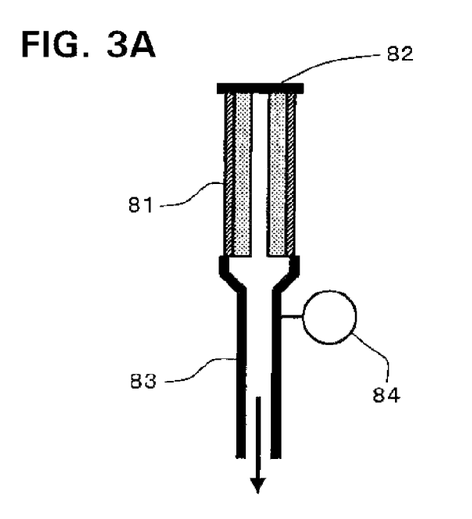
FIG. 3A is a sectional view showing a method for measuring a vacuum reaching pressure of the liquid separation membrane installation body according to the present invention, and a state in which the vacuum reaching pressure of the liquid separation membrane installation body having a cylindrical tubular shape is measured.
Figure 3B:
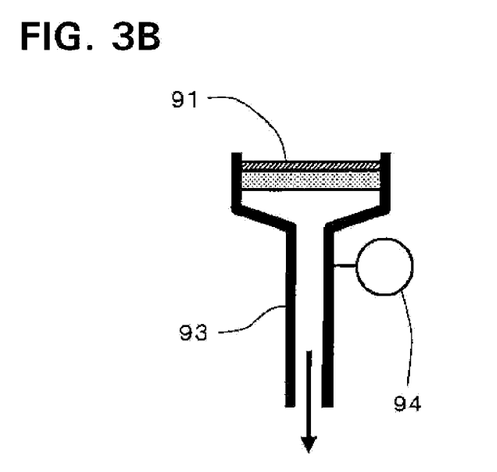
FIG. 3B is a sectional view showing a method for measuring a vacuum reaching pressure of the liquid separation membrane installation body according to the present invention, and a state in which the vacuum reaching pressure of the liquid separation membrane installation body having a flat plate shape is measured.

It is to be noted that the vacuum reaching pressure is assumed to be a reaching pressure at a time when one of the surfaces of the liquid separation membrane installation body is set to an atmospheric pressure and a pressure of the other surface thereof is reduced at an exhaust rate of 1.5 L/cm$^2$·minute by use of an oil rotary vacuum pump. For example, in a case where the liquid separation membrane installation body has a cylindrical tubular shape, as shown in FIG. 3A, a sealing member 82 made of stainless steel is airtightly jointed to one end of a liquid separation membrane installation body 81 by direct bonding, sealing via an O-ring or the like, one end of a cylindrical sample holder (a material: stainless steel) 83 for drawing vacuum is bonded to the other end of the body by the direct bonding, the sealing via the O-ring or the like, the vacuum is drawn (a pressure is reduced) from the other end of the sample holder 83 with a vacuum pump, and the reached pressure is measured with a pressure gauge 84. For example, in a case where the liquid separation membrane installation body has a flat plate shape, as shown in FIG. 3B, a liquid separation membrane installation body 91 is airtightly jointed to an enlarged portion of a sample holder (a material: stainless steel) 93 formed into a shape of a funnel such as Nutsche funnel by enlarging one end of a cylindrical shape, by direct bonding, sealing via an O-ring or the like, vacuum is drawn from the other end of the sample holder which is not enlarged, and a reached pressure is measured with a pressure gauge 94. It is to be noted that FIGS. 3A and 3B show a method for measuring the vacuum reaching pressure of the liquid separation membrane installation body according to the present invention, FIG. 3A is a sectional view showing a state at a time when the vacuum reaching pressure of the liquid separation membrane installation body having the cylindrical tubular shape is measured, and FIG. 3B is a sectional view showing a state at a time when the vacuum reaching pressure of the liquid separation membrane installation body having the flat plate shape is measured. In FIGS. 3A and 3B, arrows show vacuum drawing (pressure reducing) directions. This vacuum reaching pressure is preferably 1000 Pa or less, more preferably 500 Pa or less, further preferably 300 Pa or less. In a case where the vacuum reaching pressure is larger than 1000 Pa, there is a problem that the membrane is insufficiently densified or that a defect is present in the membrane, and hence a sufficient separation performance sometimes cannot be obtained.

It is preferable to use, as the dispersant layered inorganic compound, a dispersant layered inorganic compound such as a clay compound constituting the above-mentioned liquid separation membrane installation body of the present invention. As a method for dispersing a powder or solid dispersant layered inorganic compound in the solvent, it is preferable to disperse the compound by use of stirring with a stirrer or the like, ultrasonic vibration or the like. Moreover, there may be used a method for directly synthesizing the dispersant layered inorganic compound in the solvent by a liquid phase method such as a method of peeling the layered inorganic compound in the solvent or a sol-gel processing.

It is preferable to use water, alcohols, ketones, aromatic hydrocarbon, fatty hydrocarbon or the like as the solvent in which the dispersant layered inorganic compound is to be dispersed.

When the dispersant layered inorganic compound is dispersed in the solvent, it is preferable to use 50 to 1000 parts by mass of solvent with respect to 1 part by mass of dispersant layered inorganic compound. In consequence, when the dispersant layered inorganic compound is formed into a membrane on the surface of the porous base material, the membrane can uniformly be formed into a desired thickness. Moreover, a small amount of a binder such as polyvinyl alcohol or a dispersant may be added to the solvent.

It is preferable to use, as the porous base material, a porous base material made of a ceramic, a metal or the like constituting the above-mentioned liquid separation membrane installation body of the present invention. The porous base material made of the ceramic, the metal or the like can be manufactured by a known manufacturing method.

In a case where the dispersant layered inorganic compound is formed into the membrane on the surface of the porous base material by the filtration membrane formation, it is preferable that a slurry in which the dispersant layered inorganic compound is dispersed in the solvent is allowed to flow into one surface (an inflow surface) of the porous base material, and filtered, whereby the dispersant layered inorganic compound is deposited on the inflow surface of the porous base material, thereby forming the membrane. The membrane thickness can be controlled in accordance with a filtration time, and it is preferable to set the thickness to 0.1 to 1.5 µm. Thus, the membrane thickness of the dispersant layered inorganic compound is reduced, whereby the permeation flow rate of the resultant liquid separation membrane installation body during the liquid separation can be increased. Moreover, it is preferable to filter the slurry by suction (vacuum) filtration.

In a case where the surface of the porous base material is dip-coated with the dispersant layered inorganic compound, the membrane thickness can be controlled in accordance with a slurry concentration, a dip rate and the number of dipping times.

Next, the membrane of the dispersant layered inorganic compound formed on the surface of the porous base material is dried. There is not any special restriction on a drying method, however a conventionally known drying method such as hot air drying, microwave drying, dielectric drying, reduced-pressure drying, vacuum drying or freeze drying may be used. Drying conditions can appropriately be determined in accordance with each drying method. For example, it is preferable that the conditions of the hot air drying are set to 60 to 90° C. and 1 to 24 hours.

Next, the formed and dried membrane of the dispersant layered inorganic compound on the surface of the porous base material is fired, and the liquid separation membrane installation body can be obtained. It is preferable that firing conditions are set to 400 to 600° C. and 1 to 24 hours. Examples of an apparatus for use in firing include an electric furnace. Thus, the membrane of the dispersant layered inorganic compound formed on the surface of the porous base material is fired, and partially sintered, whereby the dispersant layered inorganic compounds are firmly bonded to each other, and even if the dispersant layered inorganic compounds are used in the liquid, they can be prevented from being dispersed again. Here, a partially sintered state is a state in which the dispersant layered inorganic compounds in the membrane are sintered and thereby bonded to each other, however the pores continued from one surface of the membrane to the other surface thereof remain in the membrane.

The pore diameters of the liquid separation membrane constituting the liquid separation membrane installation body can be controlled in accordance with a firing temperature and time.

EXAMPLES

The present invention will hereinafter be described further specifically in accordance with examples, however the present invention is not limited to these examples.

Example 1

A liquid separation membrane installation body was prepared by the following method.

(Porous Base Material)

A porous base material made of alumina and having a cylindrical tubular shape of a diameter of 10 mm×a length of 100 mm was used. The surface of the porous base material had pore diameters of 0.2 µm and a porosity of 30%.

(Slurry Preparation)

As a dispersant layered inorganic compound, smectite powder was used. The smectite powder was added to pure water so as to obtain a concentration of 0.2%, and stirred using a stirrer for 24 hours to obtain a dispersion liquid. The smectite powder manufactured by Co-op Chemical Co., Ltd. and having a trade name: Lucentite was used.

(Membrane Formation)

The dispersant layered inorganic compound (the smectite powder) was formed into a membrane on the surface of the porous base material by filtration membrane formation. A slurry in which the smectite powder was dispersed in water was allowed to flow into the porous base material from an outer surface (an inflow surface) thereof, and smectite was deposited on the inflow surface of the porous base material to form the membrane. The filtration membrane formation was performed by reducing a pressure of the inside of the porous base material with an oil rotary vacuum pump (manufactured by ULVAC, Inc., trade name: G-50DA), and performing suction filtration for 30 seconds.

(Drying, Firing)

The smectite powder was formed into the membrane on the porous base material, and then dried with hot air by using an electric furnace. Drying conditions were set to 80° C. and 12 hours. Afterward, the dried material was fired on conditions of 500° C. and 2 hours by using the electric furnace to obtain the liquid separation membrane installation body (Example 1). A membrane thickness was 0.5 µm. A membrane thickness of a liquid separation membrane was measured by using an electron microscope. A vacuum reaching pressure was measured by airtightly sealing one end of the liquid separation membrane installation body having a cylindrical can shape and provided under an atmospheric pressure, and then sucking the inside of a cylindrical tube from the other end of the body with the oil rotary vacuum pump (manufactured by ULVAC, Inc., trade name: G-50DA) at an exhaust rate of 1.5 L/cm$^2$·minute to measure the pressure in the cylindrical tube.

Example 2

A liquid separation membrane installation body (Example 2) was obtained in the same manner as in Example 1 except that a filtration time in a membrane formation step was set to 120 seconds. A membrane thickness was 1.0 µm.

Example 3

A liquid separation membrane installation body (Example 3) was obtained in the same manner as in Example 1 except that a filtration time in a membrane formation step was set to 200 seconds. A membrane thickness was 1.4 µm.

Comparative Example 1

A liquid separation membrane installation body (Comparative Example 1) was obtained in the same manner as in Example 1 except that a filtration time in a membrane formation step was set to 250 seconds. A membrane thickness was 1.7 µm.

Comparative Example 2

A liquid separation membrane installation body (Comparative Example 2) was obtained in the same manner as in Example 1 except that a filtration time in a membrane formation step was set to 300 seconds. A membrane thickness was 2.0 µm.

Comparative Example 3

A liquid separation membrane installation body (Comparative Example 3) was obtained in the same manner as in Example 1 except that a smectite concentration was set to 0.4% and a filtration time in a membrane formation step was set to 45 seconds. A membrane thickness was 2.0 µm.

Comparative Example 4

A liquid separation membrane installation body (Comparative Example 4) was obtained in the same manner as in Comparative Example 3 except that a filtration time in a membrane formation step was set to 50 seconds. A membrane thickness was 2.2 µm.

Comparative Example 5

A liquid separation membrane installation body (Comparative Example 5) was obtained in the same manner as in Comparative Example 3 except that a filtration time in a membrane formation step was set to 60 seconds. A membrane thickness was 2.5 µm.

Comparative Example 6

A liquid separation membrane installation body (Comparative Example 6) was obtained in the same manner as in Comparative Example 3 except that a filtration time in a membrane formation step was set to 90 seconds. A membrane thickness was 3.5 µm.

Comparative Example 7

A liquid separation membrane installation body (Comparative Example 7) was obtained in the same manner as in Comparative Example 3 except that a filtration time in a membrane formation step was set to 300 seconds. A membrane thickness was 6.2 µm. However, after a membrane was fired, micro cracks were generated in this membrane, and a separation test could not be performed. And a result of measuring a vacuum reaching pressure was 2000 Pa.

(Liquid Separation Test 1)

The following liquid separation test was conducted by using the resultant liquid separation membrane installation bodies of Examples 1 to 3 and Comparative Examples 1 to 6. A liquid used in separation was a mixed liquid of ethanol and water (ethanol:water=90:10 (volume ratio)).

(Container for Separation)

Figure 1:
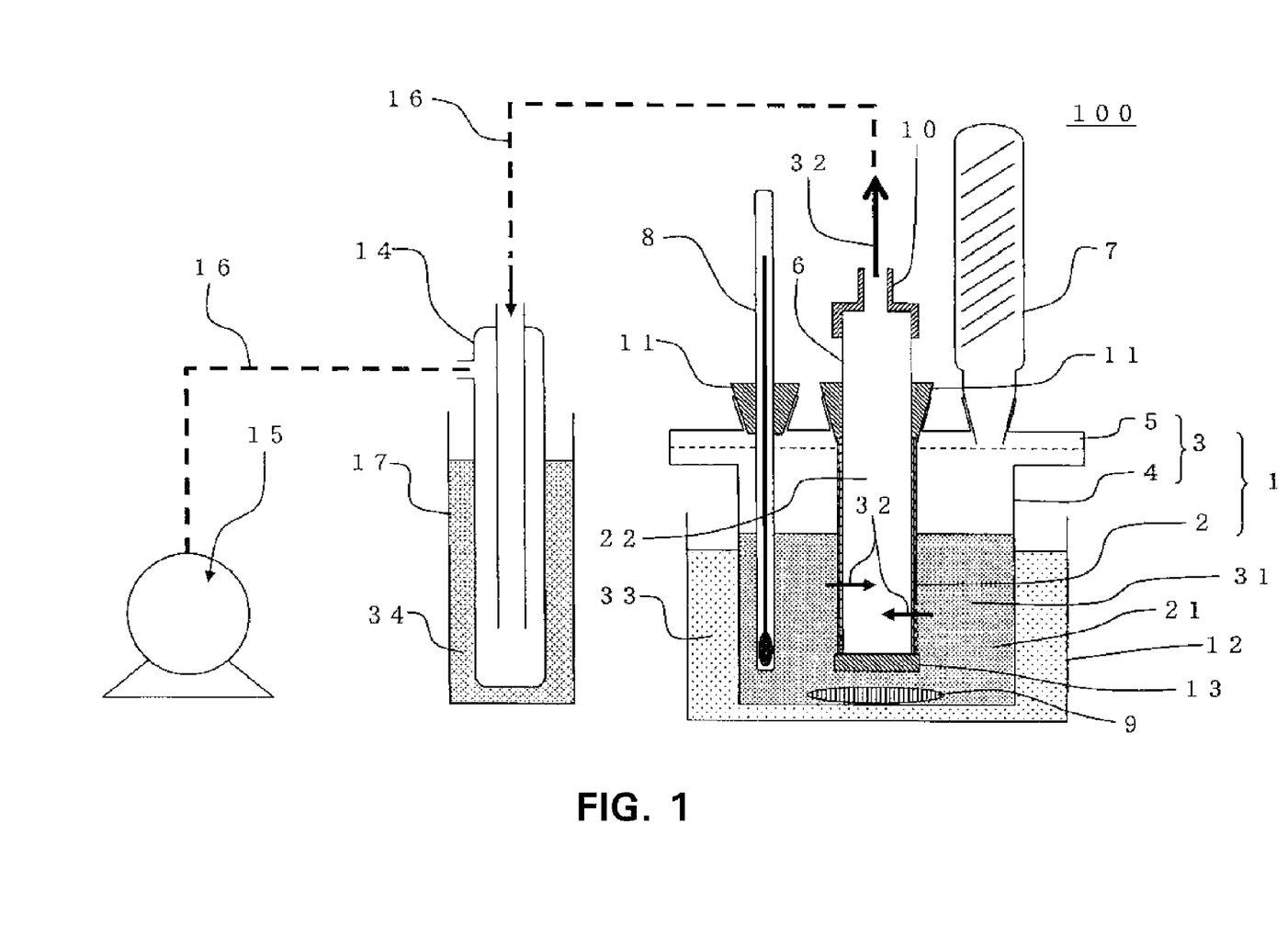
FIG. 1 is a schematic diagram showing a separation device for conducting Liquid Separation Test 1 on a liquid separation membrane installation body according to the present invention.

As shown in FIG. 1, a container main body 3 has a lid portion 5 made of glass, and a bottomed cylindrical container (made of glass) 4 having a capacity of 500 mL and a bottomed cylindrical shape. A temperature gauge 8 and a cooling tube 7 were inserted into the lid portion 5 of the container main body 3. Then, a sealing member 13 made of glass was attached to an end of a liquid separation membrane installation body 2 described above, an inner cylinder (a glass tube) 6 was connected to the other end of the body, and the glass tube 6 was connected to a pipe for pressure reduction 16 via a union 10 made of stainless steel. The glass tube 6 inserted through a rubber plug 11 was provided on the lid portion 5 (the container main body 3) so that a sealing member 13 side entered the container main body 3, thereby obtaining a container for separation 1. A stirring member 9 for a magnetic stirrer was disposed in the container main body 3 so that a mixed liquid can be stirred. It is to be noted that FIG. 1 is a schematic diagram showing a separation device for performing Liquid Separation Test 1 of the liquid separation membrane installation body according to the present invention.

(Separation Device of Mixed Liquid)

A separation device 100 shown in FIG. 1 was prepared. That is, as shown in FIG. 1, the resultant container for separation 1 was disposed in a heat medium container 12 in which a heat medium 33 was received so that a temperature could be controlled. Water was used as the heat medium 33. Then, as shown in FIG. 1, a trap unit 14 and a pressure reduction device 15 were prepared, the glass tube 6 of the container for separation 1 was connected to the pipe for pressure reduction 16 via the union 10 made of stainless steel to connect the glass tube 6 to the trap unit 14 via the pipe for pressure reduction 16, and the trap unit 14 was connected to the pressure reduction device 15 via the pipe for pressure reduction 16. A trap manufactured by Okura Riken Inc. was used as the trap unit 14, and an oil rotary vacuum pump (G50DA) was used as the pressure reduction device 15. In order to cool and trap a vapor of an incoming membrane permeable substance, the trap unit 14 was arranged in a bottomed cylindrical cold tube 17 in which liquid nitrogen 34 as a refrigerant was received.

(Separating Operation 1)

As shown in FIG. 1, an aqueous solution (a mixed liquid) 31 including 90 vol % of ethanol described above was put in the bottomed cylindrical container 4 (a mixed liquid side space 21) of the container for separation 1. Next, the mixed liquid 31 was heated to 70° C. with the heat medium 33 while stirring the mixed liquid 31 with the stirring member 9, and a pressure of the inside (a pressure reduction side space 22) of the inner cylinder 6 was reduced to 10 Pa or less. Then, a membrane permeable liquid 32 was trapped by the trap unit 14. A mass of the membrane permeable liquid obtained by the above separating operation was weighed with an electronic scale, and a composition of the liquid was analyzed by gas chromatography. A permeation flow rate was obtained from the mass of the membrane permeable liquid, an area of a liquid separation membrane, and a separating operation time. A separation coefficient of the liquid separation membrane was obtained from the following equation.

Separation coefficient={(water concentration of membrane permeable liquid)/(ethanol concentration of membrane permeable liquid)}/{(water concentration of supply liquid)/(ethanol concentration of supply liquid)}

TABLE 1

| | Membrane thickness (μm) | Permeation flow rate (kg/m$^2$·hour) | Separation coefficient | Vacuum reaching pressure (Pa) |
|---|---|---|---|---|
| Example 1 | 0.5 | 2.95 | 4.0 | 250 |
| Example 2 | 1.0 | 1.55 | 3.3 | 50 |
| Example 3 | 1.4 | 0.95 | 3.6 | 50 |
| Comparative Example 1 | 1.7 | 0.35 | 7.0 | 16 |
| Comparative Example 2 | 2.0 | 0.33 | 5.8 | 16 |
| Comparative Example 3 | 2.0 | 0.33 | 7.1 | 13 |
| Comparative Example 4 | 2.2 | 0.16 | 9.2 | 15 |
| Comparative Example 5 | 2.5 | 0.24 | 16.2 | 9 |
| Comparative Example 6 | 3.5 | 0.07 | 22.4 | 10 |

It is seen from Table 1 that the liquid separation membrane installation bodies of Examples 1 to 3 have a slightly small separation coefficient, but have a very high permeation flow rate, and a treatment amount of the body in the liquid separation can be enlarged. It is also seen that the liquid separation membrane installation bodies of Comparative Examples 1 to 6 have a large separation coefficient, but have a very low permeation flow rate, and a treatment amount of the body in the liquid separation cannot be enlarged.

(Liquid Separation Test 2)

The following liquid separation test was conducted using the liquid separation membrane installation body of Example 2. A liquid used in separation was salt water (a concentration of 0.1 mol/L).

(Separation Device of Mixed Liquid)

Figure 2:
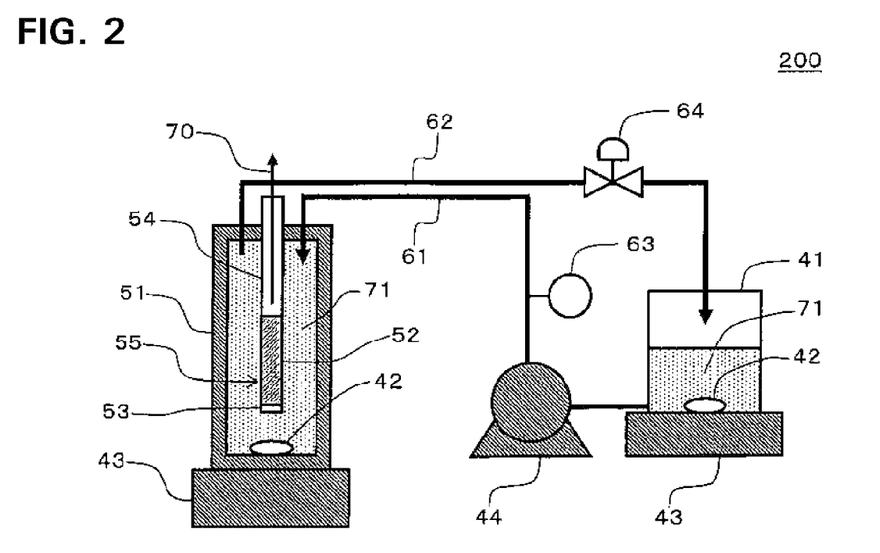
FIG. 2 is a schematic diagram showing a separation device for conducting Liquid Separation Test 2 on the liquid separation membrane installation body according to the present invention.

FIG. 2 is a schematic diagram showing a separation device for conducting Liquid Separation Test 2 on a liquid separation membrane installation body according to the present invention. A separation device 200 shown in FIG. 2 is suitable for a liquid separation test using salt water. The separation device 200 includes a storage container (a material: glass) 41 in which a liquid received therein can be stirred using a stirrer 43 and a stirring member 42, a liquid supply pump 44 capable of sending the liquid in the storage container 41, and a pressure-resistant container (a material: stainless steel) 51 into which the liquid in the storage container 41 can be sent by the liquid supply pump 44. The liquid supply pump 44 is connected to the pressure-resistant container 51 via a liquid supply pipe 61 having a pressure gauge 63, and the liquid in the storage container 41 is sent into the pressure-resistant container 51 via the liquid supply pump 44 and the liquid supply pipe 61. Moreover, it is constituted that the pressure-resistant container 51 is connected to the storage container 41 via a collection pipe 62 having a back pressure valve 64, the pressure-resistant container 51 is filled with the liquid sent by the liquid supply pump 44, and the liquid which has overflowed from the pressure-resistant container 51 is returned to the storage container 41 through the collection pipe 62. A pressure in the pressure-resistant container 51 is controlled by the liquid supply pump 44 and the back pressure valve 64 to separate the mixed liquid while keeping the pressure in the pressure-resistant container 51 to be constant. The liquid in the pressure-resistant container 51 can be stirred with the stirrer 43 and the stirring member 42. In the pressure-resistant container 51, a sample attachment portion 55 is provided which is formed by sealing one end of a cylindrical liquid separation membrane installation body 52 with a sealing member (a material: stainless steel) 53 and connecting a cylindrical sample holder (a material: stainless steel) 54 to the other end of the body. The sample holder 54 is connected to the other end of the liquid separation membrane installation body 52 so that one end of the sample holder comes in close contact with the other end of the body. The sample attachment portion 55 is provided in the pressure-resistant container 51 in a state in which the other end (an end that is not connected to the liquid separation membrane installation body 52) of the sample holder 54 is provided externally from the pressure-resistant container 51, and the inside of the liquid separation membrane installation body 52 having a cylindrical shape communicates with the outside of the pressure-resistant container 51. A connecting portion between the sample attachment portion 55 and the pressure-resistant container 51 is connected in a liquid tight manner so that any liquid does not leak.

(Separating Operation 2)

As shown in FIG. 2, salt water (a mixed liquid) 71 having a concentration of 0.1 mol/L as described above was put in the storage container 41. Next, while stirring the mixed liquid with the stirring member 42, the mixed liquid 71 was sent to the pressure-resistant container 51 by the liquid supply pump 44, and the mixed liquid 71 which has overflowed from the pressure-resistant container 51 was collected in the storage container 41 through the collection pipe 62, whereby the mixed liquid 71 was circulated while pressurizing the inside of the pressure-resistant container 51 to 0.8 MPaG. Then, a membrane permeable liquid 70 passed through the liquid separation membrane installation body 52 was trapped using a syringe. A salt concentration of the membrane permeable liquid 70 obtained by the above separating operation was measured with a salt concentration gauge. An ion removal ratio was obtained from the following equation:

Ion removal ratio (%)={(salt concentration of supply liquid)−(salt concentration of membrane permeable liquid)}/(salt concentration of supply liquid)×100

When the ion removal ratio of the liquid separation membrane installation body of Example 2 was measured, the ion removal ratio was 70%.

INDUSTRIAL APPLICABILITY

The present invention can be used as a liquid separation membrane installation body provided with a liquid separation membrane capable of separating water or the like from a mixed liquid such as salt water, a water-alcohol mixed liquid, a water-acid mixed liquid or a water-alkali mixed liquid.

More particularly, the present invention can be used as a liquid separation membrane installation body capable of increasing a permeation flow rate to increase a treatment amount in liquid separation.

The invention claimed is:

1. A liquid separation membrane installation body comprising:
   a porous base material; and
   a liquid separation membrane provided on the porous base material, the liquid separation membrane being a sintered porous membrane having a thickness in a range of 0.1 to 1.5 µm, and being formed of a sheet-like dispersant layered inorganic compound that is non-porous and has a thickness of 0.1 nm to 100 nm, a major diameter of 0.01 µm to 5 µm and an aspect ratio (major diameter/thickness) of 3 or more,
   wherein a plurality of the sheet-like dispersant layered inorganic compounds are deposited as superimposed layers on the porous base material so as to form pores between the superimposed layers that extend substantially parallel to an upper surface of the porous base material such that a liquid flows primarily through the pores formed between the superimposed layers.

2. The liquid separation membrane installation body according to claim 1, wherein the dispersant layered inorganic compound is at least one selected from the group consisting of a clay compound, a silica nano sheet, a titania nano sheet, a niobium oxide nano sheet and a graphite nano sheet.

3. The liquid separation membrane installation body according to claim 2, wherein the clay compound is at least one selected from the group consisting of smectite, vermiculite and mica.

4. The liquid separation membrane installation body according to claim 1, wherein an average pore diameter of the liquid separation membrane is in a range of 0.1 to 10 nm.

5. The liquid separation membrane installation body according to claim 1, wherein the liquid separation membrane has an exhaust rate of 1.5 $L/cm^2$·minute when one of the surfaces of the liquid separation membrane is set to an atmospheric pressure and the other surface is set to a vacuum pressure of 1000 Pa or less.

6. The liquid separation membrane installation body according to claim 1, wherein the liquid separation membrane is formed by filtration membrane formation on the surface of the porous base material.

* * * * *